United States Patent [19]
Curry et al.

[11] Patent Number: 5,805,702
[45] Date of Patent: Sep. 8, 1998

[54] METHOD, APPARATUS, AND SYSTEM FOR TRANSFERRING UNITS OF VALUE

[75] Inventors: Stephen M. Curry, Dallas; Donald W. Loomis, Coppell; Christopher W. Fox, Dallas, all of Tex.

[73] Assignee: Dallas Semiconductor Corporation, Dallas, Tex.

[21] Appl. No.: 595,014

[22] Filed: Jan. 31, 1996

Related U.S. Application Data

[60] Provisional application No. 60/004,510, Sep. 29, 1995.
[51] Int. Cl.$^6$ ........................................................ H04L 9/00
[52] U.S. Cl. .............................................................. 380/24
[58] Field of Search .................................. 380/23, 24, 25, 380/30; 364/717, 464.02

[56] References Cited

U.S. PATENT DOCUMENTS

| | | | |
|---|---|---|---|
| 4,630,201 | 12/1986 | White | 364/408 |
| 5,077,792 | 12/1991 | Herring | 380/24 |
| 5,577,121 | 11/1996 | Davis et al. | 380/24 |

*Primary Examiner*—Thomas H. Tarcza
*Assistant Examiner*—Carmen D. White
*Attorney, Agent, or Firm*—Jenkens & Gilchrist

[57] ABSTRACT

The present invention relates to an electronic module used for secure transactions. More specifically, the electronic module is capable of passing encrypted information back and forth between a service provider's equipment via a secure, encrypted technique so that money and other valuable data can be securely passed electronically. The module is capable of being programmed, keeping track of real time, recording transactions for later review, and creating encryption key pairs.

15 Claims, 8 Drawing Sheets

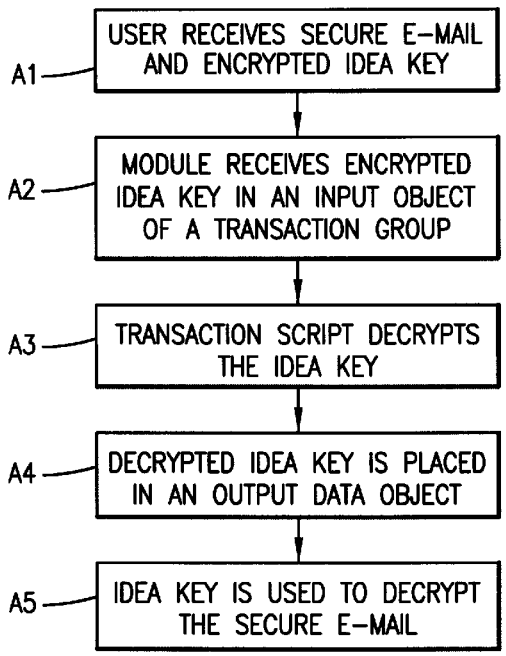
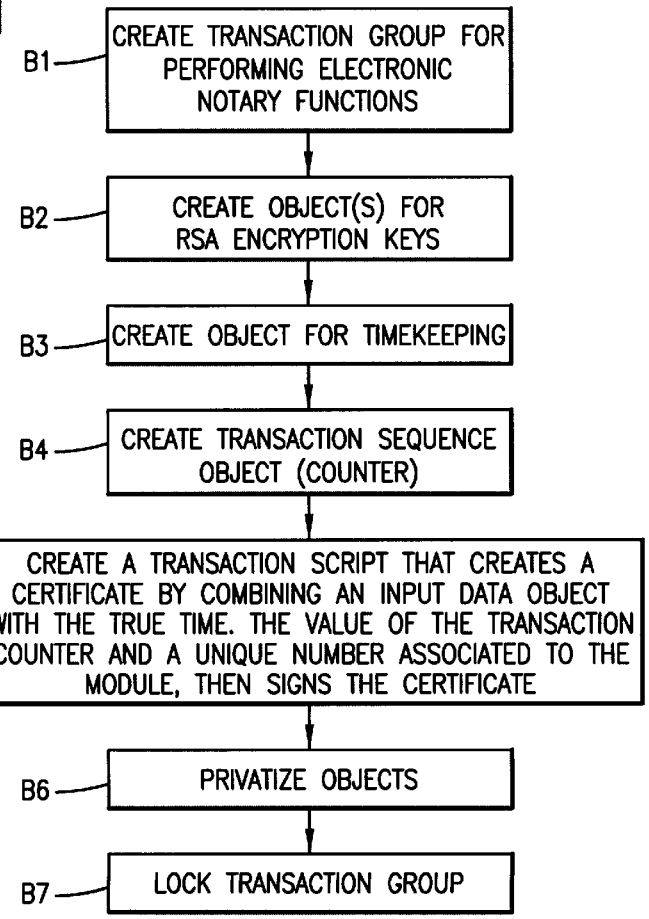

METHOD, APPARATUS, AND SYSTEM FOR TRANSFERRING UNITS OF VALUE

BACKGROUND OF THE INVENTION

1. Technical Field of the Invention

The present invention relates to a method, apparatus and system for transferring money or its equivalent electronically. In particular, in an electronic module based system, the module can be configured to provide at least secure data transfers or to authorize monetary transactions.

2. Description of Related Art

Presently, credit cards that have a magnetic strip associated with them, are a preferred monetary transaction medium in the market place. A card user can take the card to an automatic cash machine, a local store or a bank and make monetary transactions. In many instances the card is used via a telephone interface to make monetary exchanges. The magnetic strip card is used to help identify the card and user of the card. The card provides a relatively low level of security for the transfer. Regardless, the card enables a card holder to buy products, pay debts and make monetary exchanges between separate bank accounts.

Improvements have been made to the magnetic strip card. There have been cards created with microcircuits instead of magnetic strips. In general the microcircuit, like a magnetic strip, is used to enable a card-reader to perform a transaction.

SUMMARY OF THE INVENTION

The present invention is an apparatus, system and method for communicating encrypted information between a preferably portable module and a service provider's equipment. The invention comprises a module, that has a unique identification, that is capable of creating a random number, for example, a SALT, and passing the random number, along with, for example, a request to exchange money, to a service provider's equipment. The service provider's equipment may in return encrypt the random number with a private or public key (depending on the type of transaction), along with other information and pass the encrypted information back to the module as a signed certificate. The module, upon receiving the signed certificate, will decrypt the certificate with a public or private key (depending on the type of transaction) and compare the decrypted number with the original random number. Furthermore, if the numbers are the same then the transaction that was requested may be deemed secure and thereby proceeds. The module is capable of time stamping and storing in memory information about the transaction for later review.

BRIEF DESCRIPTION OF THE DRAWINGS

A more complete understanding of the method and apparatus of the present invention may be had by reference to the following Detailed Description when taken in conjunction with the accompanying Drawings wherein:

FIG. 3 is an exemplary technique for receiving an E-mail message;

FIG. 4 is an exemplary technique for preparing a module for notary functions;

DETAILED DESCRIPTION OF A PRESENTLY PREFERRED EXEMPLARY EMBODIMENT

Figure 1:
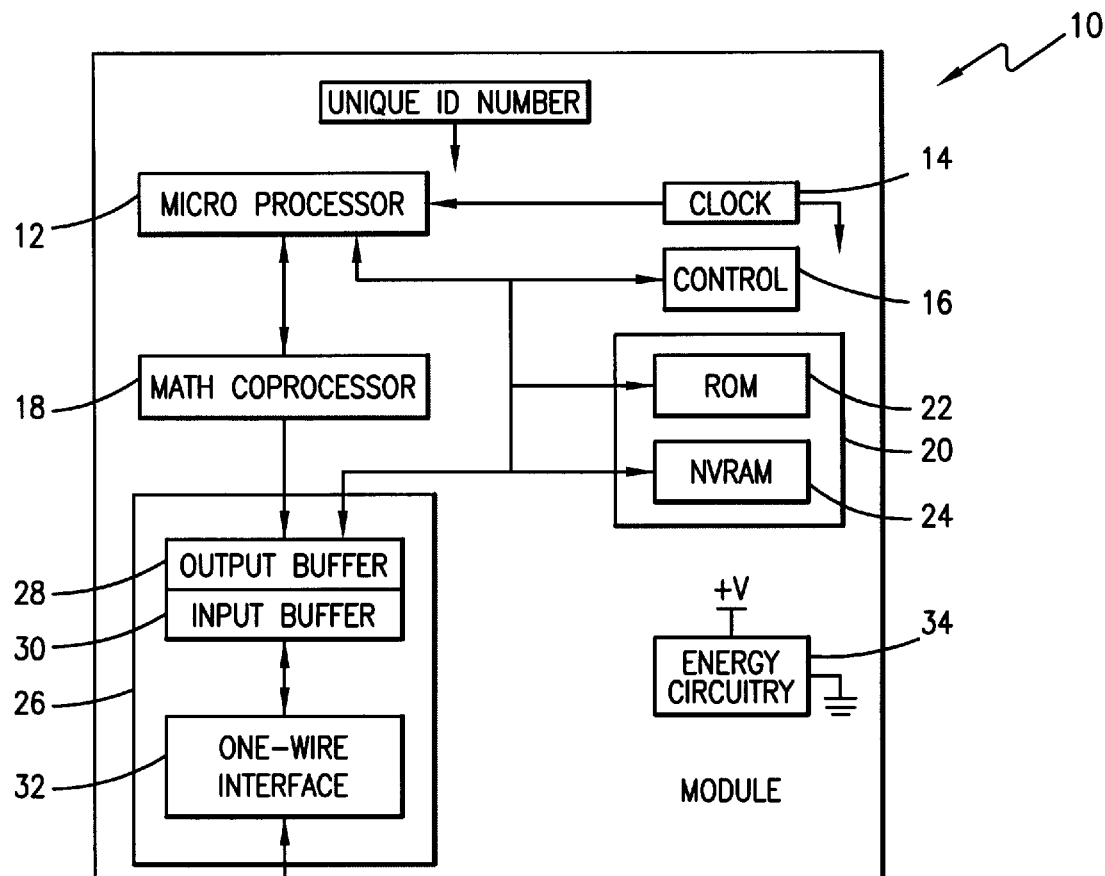
FIG. 1 is a block diagram of an embodiment of a module.

FIG. 1 depicts a block diagram of an exemplary module 10 that incorporates an exemplary embodiment of the present invention. The module circuitry can be a single integrated circuit. It is understood that the module 10 could also be on multiple integrated or descrete element circuits combined combined together. The module 10 comprises a microprocessor 12, a real time clock 14, control circuitry 16, a math coprocessor 18, memory circuitry 20, input/output circuitry 26, and an energy circuit.

The module 10 could be made small enough to be incorporated into a variety of objects including, but not limited to a token, a card, a ring, a computer, a wallet, a key fob, badge, jewelry, stamp, or practically any object that can be grasped and/or articulated by a user of the object.

The microprocessor 12 is preferably an 8-bit microprocessor, but could be 16, 32, 64 or any operable number of bits. The clock 14 provides timing for the module circuitry. There can also be separate clock circuitry 14 that provides a continuously running real time clock.

The math coprocessor circuitry 18 is designed and used to handle very large numbers. In particular, the coprocessor will handle the complex mathematics of RSA encryption and decryption.

The memory circuitry 20 may contain both read-only-memory and non-volatile random-access-memory. Furthermore, one of ordinary skill in the art would understand that volatile memory, EPROM, SRAM and a variety of other types of memory circuitry could be used to create an equivalent device.

Control circuitry 16 provides timing, latching and various necessary control functions for the entire circuit.

An input/output circuit 26 enables bidirectional communication with the module 10. The input/output circuitry 26 preferably comprises at least an output buffer 28 and an input buffer. For communication via a one-wire bus, one-wire interface circuitry 32 can be included with the input/output circuitry 26.

An energy circuit 34 may be necessary to maintain the memory circuitry 20 and/or aid in powering the other circuitry in the module 10. The energy circuit 34 could consist of a battery, capacitor, R/C circuit, photovoltaic cell, or any other equivalent energy producing circuit or means.

The firmware architecture of a preferred embodiment of a secure transaction module and a series of sample applications using the module 10 will now be discussed. These examples are intended to illustrate a preferred feature set of the module 10 and to explain the services that the module offers. These applications by no means limit the capabilities of the invention, but instead bring to light a sampling of its capabilities.

I. OVERVIEW OF THE PREFERRED MODULE AND ITS FIRMWARE DESIGN

The module 10 preferably contains a general-purpose, 8051-compatible micro controller 12 or a reasonably similar product, a continuously running real-time clock 14, a high-speed modular exponentiation accelerator for large integers (math coprocessor) 18, input and output buffers 28, 30 with a one-wire interface 32 for sending and receiving data, 32 Kbytes of ROM memory 22 with preprogrammed firmware, 8 Kbytes of NVRAM (non-volatile RAM) 24 for storage of critical data, and control circuitry 16 that enables the micro controller 12 to be powered up to interpret and act on the data placed in an input circuitry 26. The module 10 draws its operating power from the one-wire line. The micro controller 12, clock 14, memory 20, buffers 28, 30, one-wire front-end 32, modular exponentiation accelerator 18, and control circuitry 16 are preferably integrated on a single silicon chip and packaged in a stainless steel microcan using packaging techniques which make it virtually impossible to probe the data in the NVRAM 24 without destroying the data. Initially, most of the NVRAM 24 is available for use to support applications such as those described below. One of ordinary skill will understand that there are many comparable variations of the module design. For example, volatile memory can be used, or an interface other than a one-wire could be used. The silicon chip can be packaged in credit cards, rings etc.

The module 10 is preferably intended to be used first by a Service Provider who loads the module 10 with data to enable it to perform useful functions, and second by an End User who issues commands to the module 10 to perform operations on behalf of the Service Provider for the benefit of the End User. For this reason, the module 10 offers functions to support the Service Provider in setting up the module for an intended application. It also offers functions to allow the End User to invoke the services offered by the Service Provider.

Figure 11:
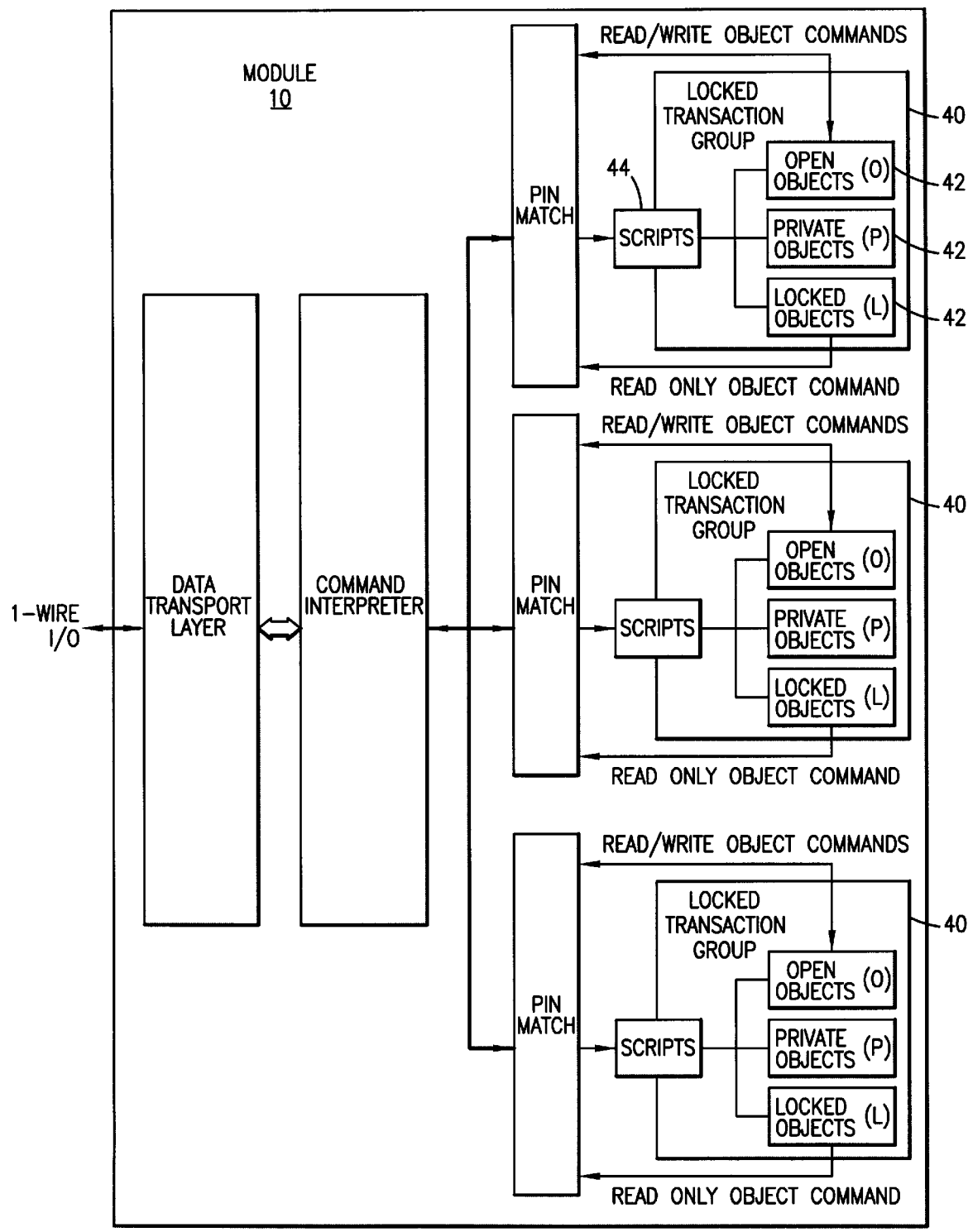
FIG. 11 is an exemplary organization of the software and firmware within a module.
Figure 12:
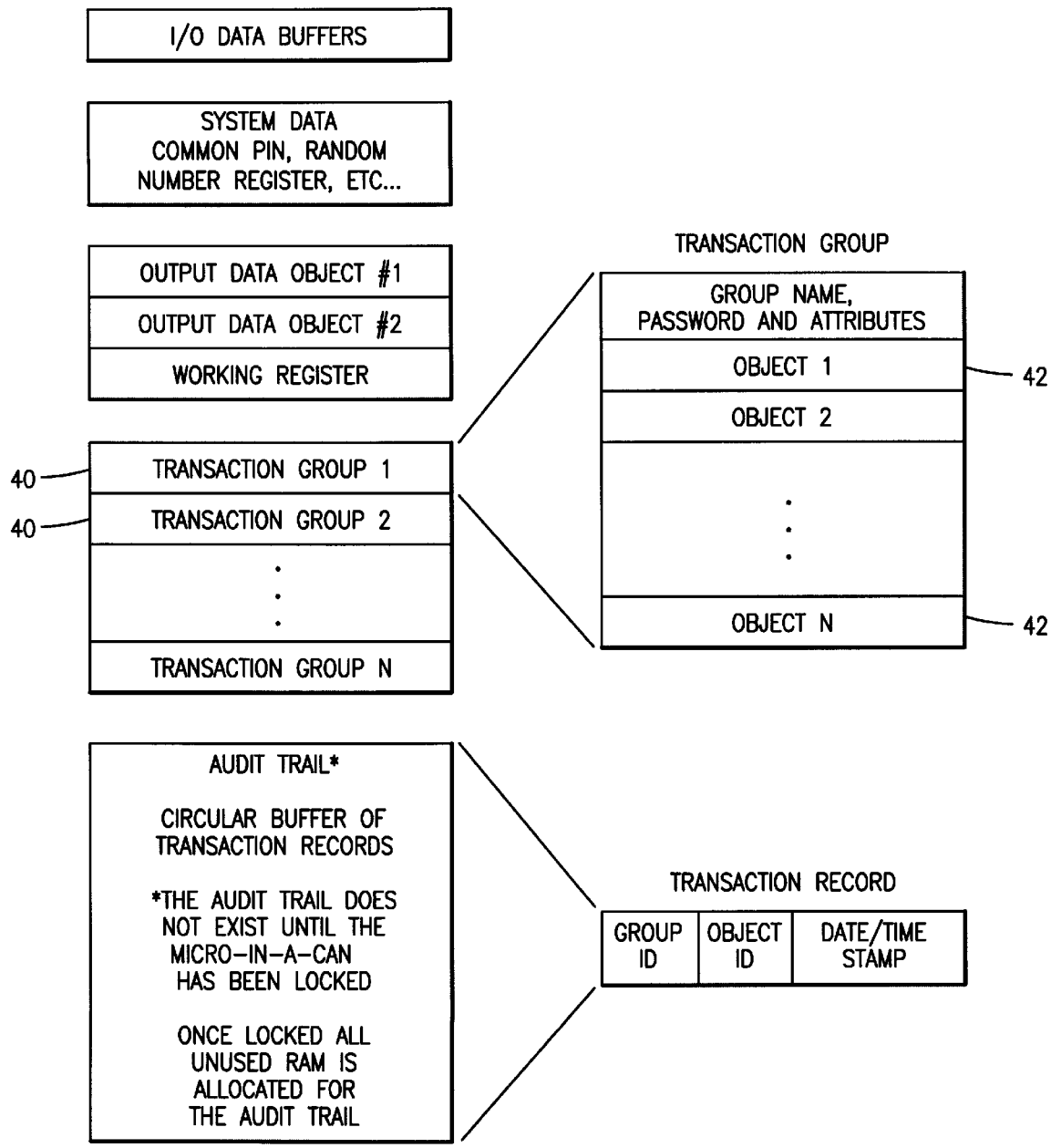
FIG. 12 is an exemplary configuration of software and firmware within a module.

Each Service Provider can reserve a block of NVRAM memory to support its services by creating a transaction group 40(refer to FIGS. 11 and 12). A transaction group 40 is simply a set of objects 42 that are defined by the Service Provider. These objects 42 include both data objects (encryption keys, transaction counts, money amounts, date/time stamps, etc.) and transaction scripts 44 which specify how to combine the data objects in useful ways. Each Service Provider creates his own transaction group 40, which is independent of every other transaction group 40. Hence, multiple Service Providers can offer different services in the same module 10. The number of independent Service Providers that can be supported depends on the number and complexity of the objects 42 defined in each transaction group 40. Examples of some of the objects 42 that can be defined within a transaction group 40 are the following:

RSA Modulus Clock Offset
RSA Exponent Random SALT
Transaction Script Configuration Data
Transaction Counter Input Data
Money Register Output Data
Destructor Within each transaction group 40 the module 10 will initially accept certain commands which have an irreversible effect. Once any of these irreversible commands are executed in a transaction group 40, they remain in effect until the end of the module's useful life or until the transaction group 40, to which it applies, is deleted from the module 10. In addition, there are certain commands which have an irreversible effect until the end of the module's life or until a master erase command is issued to erase the entire contents of the module 10. These commands will be discussed further below. These commands are essential to give the Service Provider the necessary control over the operations that can be performed by the End User. Examples of some of the irreversible commands are:

Privatize Object Lock Object
Lock Transaction Group Lock Micro-In-A-Can™

Since much of the module's utility centers on its ability to keep a secret, the Privatize command is a very important irreversible command.

Once the module 10, as a whole, is locked, the remaining NVRAM memory 24 is allocated for a circular buffer for holding an audit trail of previous transactions. Each of the transactions are identified by the number of the transaction group, the number of the transaction script 40 within the specified group, and the date/time stamp.

The fundamental concept implemented by the firmware is that the Service Provider can store transaction scripts 44 in a transaction group 40 to perform only those operations among objects that he wishes the End User to be able to perform. The Service Provider can also store and privatize RSA key or keys (encryption keys) that allow the module 10 to "sign" transactions on behalf of the Service Provider, thereby guaranteeing their authenticity. By privatizing and/or locking one or more objects 42 in the transaction group 40, the Service Provider maintains control over what the module 10 is allowed to do on his behalf. The End User cannot add new transaction scripts 44 and is therefore limited to the operations on objects 42 that can be performed with the transaction scripts 44 programmed by the Service Provider.

II. USAGE MODELS OF THE MODULE

This section presents a series of practical applications of the module 10, ranging from the simplest to the most complex. Each of these applications is described in enough detail to make it clear why the module 10 is the central enabling technology for that application.

A. BACKGROUND OF SECURE E-MAIL

In this section we provide an example of how a module 10 could be used to allow anyone to receive his or her own e-mail securely at any location.

1. Standard E-Mail

In a standard e-mail system, a user's computer is connected to a provider of Internet services, and the user's computer provides an e-mail password when polling the provider's computer for new mail. The mail resides on the provider's computer in plain text form, where it can be read by anyone working there. In addition, while traveling from its source, the mail passes through many computers and was also exposed at these locations. If the user receives his mail from his provider over a local area network, anyone else on the same network can capture and read the mail. Finally, with many e-mail systems that do not require the user to enter the password, anyone sitting at the user's computer can retrieve and read his mail, since his computer automatically provides the password when it polls the provider's computer.

It is frequently also possible to copy the password from a configuration file in the user's computer and use it to read his mail from a different computer. As a result of this broad distribution of the e-mail in plain text form and the weakness of password protection, standard e-mail is regarded as very insecure.

To counter this problem, the security system known as P.G.P. (Pretty Good Privacy) was devised. To use P.G.P., a user generates a complete RSA key set containing both a public and private component. He makes his public key widely available by putting it in the signature block of all his e-mail messages and arranging to have it posted in publicly accessible directories of P.G.P. public keys. He stores his private key on his own personal computer, perhaps in a password-protected form. When someone wishes to send private e-mail to this user, he generates a random IDEA encryption key and encrypts the entire message with the IDEA encryption algorithm. He then encrypts the IDEA key itself using the public key provided by the intended recipient. He e-mails both the message encrypted with IDEA and the IDEA key encrypted with the user's public key to the user. No one that sees this transmission can read it except the intended recipient because the message is encrypted with IDEA and the IDEA key is encrypted with the intended recipient's public key. The recipient's computer contains the corresponding private key, and hence can decrypt the IDEA key and use the decrypted IDEA key to decrypt the message. This provides security from those who might try to read the user's mail remotely, but it is less effective when the user's computer is accessible to others because the computer, itself, contains the private key. Even if the private key is password protected, it is often easy to guess the user's password or eavesdrop on him when he enters it, so the user's computer provides little security. In addition, the user can receive secure e-mail only at his own computer because his private key is stored in that computer and is not available elsewhere. Therefore, the weakness of P.G.P. is that it is tied strongly to the user's computer where the private key resides.

2. Module Protected E-Mail

Figure 2:
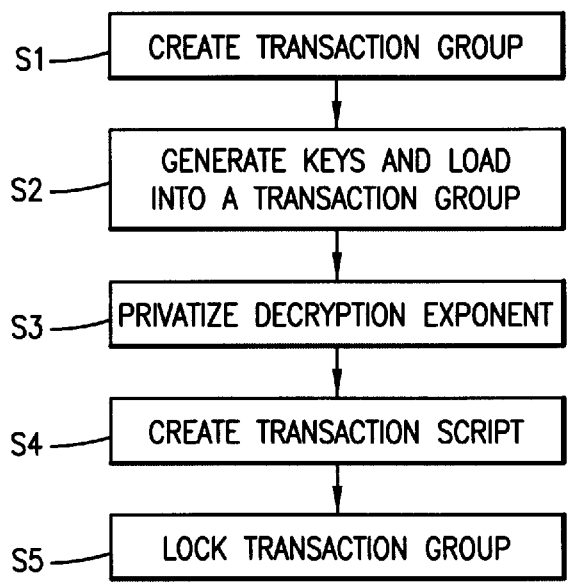
FIG. 2 is an exemplary process for creating a transaction group.

With the exemplary module 10 being used to protect e-mail, a user could have his e-mail forwarded to him wherever he goes without fear that it would be read by others or that his PC would be the weak link that compromises the security of his mail. The module protected e-mail system is similar to the P.G.P. system, except that the private key used for decrypting the IDEA key is stored in a privatized object in a transaction group of the module 10 instead of in a PC. The module protected e-mail system operates as follows:

a. Referring to FIGS. 2, 11 and 12, the user creates a transaction group 40, S1, generates an RSA key set S2 and loads it into three objects 42 of the transaction group 40 (one RSA modulus object, N, and two RSA exponent objects, E and D). He then privatizes the decryption exponent S3, D. Finally, he creates a transaction script 44, S4 to take data placed in the input data object, encrypt it with the modulus N and private exponent D and place the result in the output data object. He locks the group S5 to prevent any additional transaction scripts 44 from being added. He "forgets" the value of D and publishes the values of E and N in public directories and in the signature blocks of his e-mail messages. Since he has forgotten D and since the D exponent object has been privatized, there is no way that anyone will ever find out the value of D.

b. Referring to FIG. 3, to send secure e-mail to the user, the P.G.P. system is used. When the user receives the secure e-mail A1, he transmits the encrypted IDEA key into the input data object of the transaction group 40, A2 and then calls the transaction script 44 to decrypt this key A3 and place the decrypted result in the output data object A4. He then reads the decrypted IDEA key from the output data object and uses it to decrypt his mail A5. Note that it is now impossible for anyone, including the user, to read any new mail without having physical possession of the module 10. There is therefore no way that a user's mail can be read without his knowledge, because the module 10 must be physically present on the computer where the mail is read. The user can carry his module 10 wherever he goes and use it to read his forwarded mail anywhere. His home computer is not the weak point in the security system.

Secure e-mail, as described above, is the simplest possible module application, requiring only one RSA key and one transaction script 44. It is unnecessary even to store the public key E in the module 10, but it is a good idea to do so because the public key is supposed to be publicly accessible. By storing E in an exponent object and not privatizing that object or the modulus object, N, the user insures that the public key can always be read from the module 10. There are no transaction scripts 44 involving E because the module 10 will never be required to perform an encryption.

B. DIGITAL NOTARY SERVICE

This section describes a preferred notary service using the module 10.

1. Background of a Standard Notary Service

A conventional Notary Service Provider receives and examines a document from an End User and then supplies an uncounterfeitable mark on the document signifying that the document was presented to the notary on a certain date, etc. One application of such a notary service could be to record disclosures of new inventions so that the priority of the invention can later be established in court if necessary. In this case, the most important service provided by the notary is to certify that the disclosure existed in the possession of the inventor on a certain date. (The traditional method for establishing priority is the use of a lab notebook in which inventors and witnesses sign and date disclosures of significant inventions.)

2. Electronic Notary Service Using The Module

Figure 5:
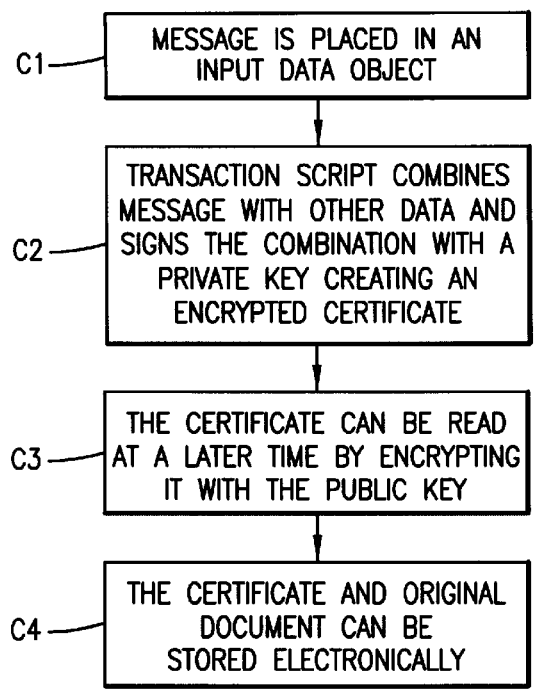
FIG. 5 is an exemplary technique for using the module as a notary.

A company, hereafter referred to as the Service Provider, decides to go into business to supply a notary service (strictly, a priority verification service) for its customers, hereafter referred to as the End Users. The Service Provider chooses to do this by using the module 10 as its "agents" and gives them the authority to authenticate (date and sign) documents on his behalf. The preferred operation of this system is as follows:

a. Referring to FIGS. 4, 11 and 12, the Service Provider creates a transaction group 40 for performing electronic notary functions in a "registered lot" of modules 10, B1.

b. The Service Provider uses a secure computing facility to generate an RSA key set and program the set into every module 10 as a set of three objects 42, a modulus object and two exponent objects B2. The public part of the key set is made known as widely as possible, and the private part is forgotten completely by the Service Provider. The private exponent object is privatized to prevent it from being read back from the modules 10.

c. The Service Provider reads the real-time clock 14 from each module 10 and creates a clock offset object that contains the difference between the reading of the real-time clock 14 and some convenient reference time (e.g., 12:00 a.m. Jan. 1, 1970). The true time can then be obtained from any module 10 by adding the value of the clock offset object to the real-time clock B3.

d. The Service Provider creates a transaction sequence counter object initialized to zero B4.

e. The Service Provider creates a transaction script 44 which appends the contents of the input data object to the true time (sum of real-time clock 14 and the value of the clock offset object) followed by the value of the transaction counter followed by the unique lasered registration number. The transaction script 44 then specifies that all of this data be encrypted with the private key and placed in the output data object. The instructions to perform this operation are stored in the transaction group 40 as a transaction script object B5.

f. The Service Provider privatizes any other objects 42 that it does not wish to make directly readable or writable B6.

g. The Service Provider locks the transaction group 40, preventing any additional transaction scripts 44 from being added B7.

h. Referring to FIG. 5, now the Service Provider distributes the modules to paying customers (End Users) to use for notary services. Anytime an End User wishes to have a document certified, the End User performs the Secure Hash Algorithm (Specified in the Secure Hash Standard, FIPS Pub. 180) to reduce the entire document to a 20 byte message digest. The End User then transmits the 20 byte message digest to the input data object C1 and calls on the transaction script 44 to bind the message digest with the true time, transaction counter, and unique lasered serial number and to sign the resulting packet with the private key C2.

i. The End User checks the certificate by decrypting it with the public key and checking the message digest, true time stamp, etc. to make sure they are correct C3. The End User then stores this digital certificate along with the original copy of the document in digital form C4. The Service Provider will attest to the authenticity of the certificates produced by its modules.

j. After a period of time specified by the Service Provider, the user returns his module 10, pays a fee, and gets a new module containing a new private key. The old modules can be recycled by erasing the entire transaction group and reprogramming them. The Service Provider maintains an archive of all the public keys it has ever used so that it can testify as needed to the authenticity of old certificates.

C. DIGITAL CASH DISPENSER

This exemplary usage model focuses on the module 10 as a cash reservoir from which payments can be made for goods or services. (To simplify the discussion, the subject of refilling the module 10 with cash is postponed until later). In this case the Service Provider is a bank or other financial institution, the End User is the bank's customer who wishes to use the module 10 to make purchases, and the Merchant is the provider of the purchased goods or services. The roles of the Service Provider, the Merchant, and the End User in these transactions are explained in detail below.

The fundamental concept of the digital cash purse as implemented in the module 10 is that the module 10 initially contains a locked money object containing a given cash value, and the module 10 can generate, on demand, certificates which are essentially signed documents attesting to the fact that the amount of money requested was subtracted from the value of the money object. These signed documents are equivalent to cash, since they attest to the fact that the internal money object was decreased in value by an amount corresponding to the value of the certificate. The merchant can redeem these certificates for cash by returning them to the Service Provider.

When dealing with digital certificates representing cash, "replay" or duplication is a fundamental problem. Since digital data can be copied and retransmitted easily, it differs from ordinary coins or paper money which are difficult to reproduce because of the special technology that is used in their manufacture. For this reason, the receiver of the payment must take special steps to insure that the digital certificate he receives is not a replay of some previously issued certificate. This problem can be solved by having the payee generate a random "SALT", a challenge number, and provide it to the payer.

SALT is a method of preventing replay. A random number is sent and used in a challenge/response mode. The other party is challenged to return the random number as part of their response.

The payer constructs a signed certificate which includes both the money amount and the payee's SALT. When the payee receives this certificate, he decrypts it with the public key, checks the money amount, and then confirms that the SALT is the same as the one he provided. By personalizing the certificate to the payee, the payer proves to the payee that the certificate is not a duplicate or replay and is therefore authentic. This method can be used regardless of whether the module 10 is the payer or the payee.

Another problem that must be addressed is irrepudiability. This means that none of the parties to the transaction should be able to argue that he did not actually participate in the transaction. The transaction record (money certificate) should contain elements to prove that each party to the transaction was a willing participant.

1. Background Conventional Cash Transactions

In a conventional cash transaction, the End User first receives Federal Reserve Notes from a bank and the bank subtracts the equivalent amount of money from the balance in his account. The End User can verify the authenticity of the Federal Reserve Notes by means of the "public key", which includes:

a. Magnetic ink attracted by a magnet.

b. Red and blue threads imbedded in the paper.

c. Microfine printing surrounding the engraved portrait.

d. Embedded stripe printed with USA and denomination of the note.

The "private key" to this system is the details of how the raw materials for printing money are obtained and how the money is actually printed. This information is retained by the government and not revealed.

These notes are carried by the End User to the Merchant, where they are exchanged for goods or services. The Merchant also uses the "public key" of the notes to verify that they are legitimate.

Finally, the Merchant carries the notes to a Bank, where the "public key" is again examined by the teller. If the notes are legitimate, the Merchant's bank account balance is increased by the face value of the notes.

The end result of this transaction is that the End User's bank balance is reduced, the Merchant's bank balance is increased by the same amount, the goods or services are transferred from the Merchant to the End User, and the Federal Reserve Notes are ready to be reused for some other transaction.

2. Exemplary Monetary Transactions Using The Module

Figure 6:
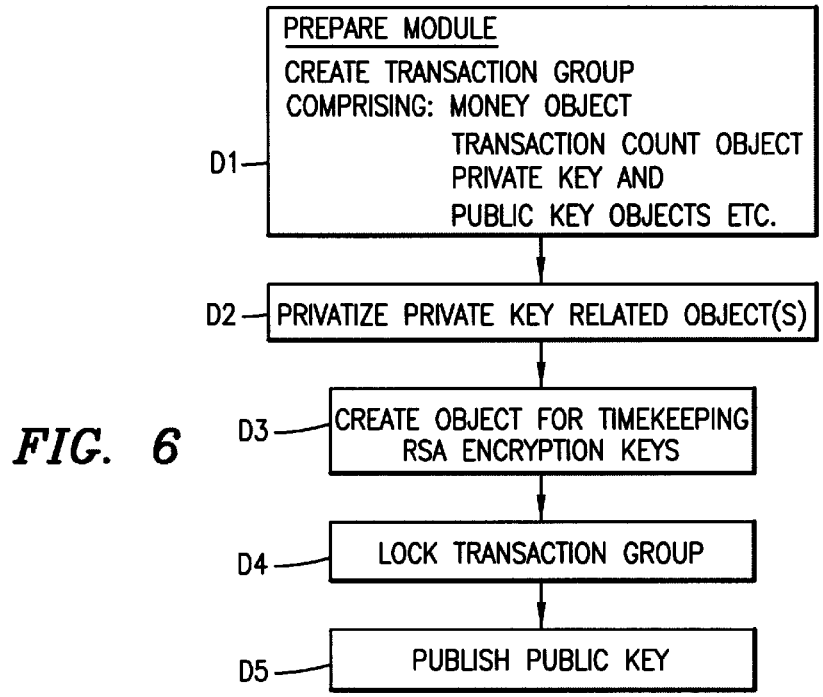
FIG. 6 is an exemplary technique for preparing a module to perform a money transaction.
Figure 7:
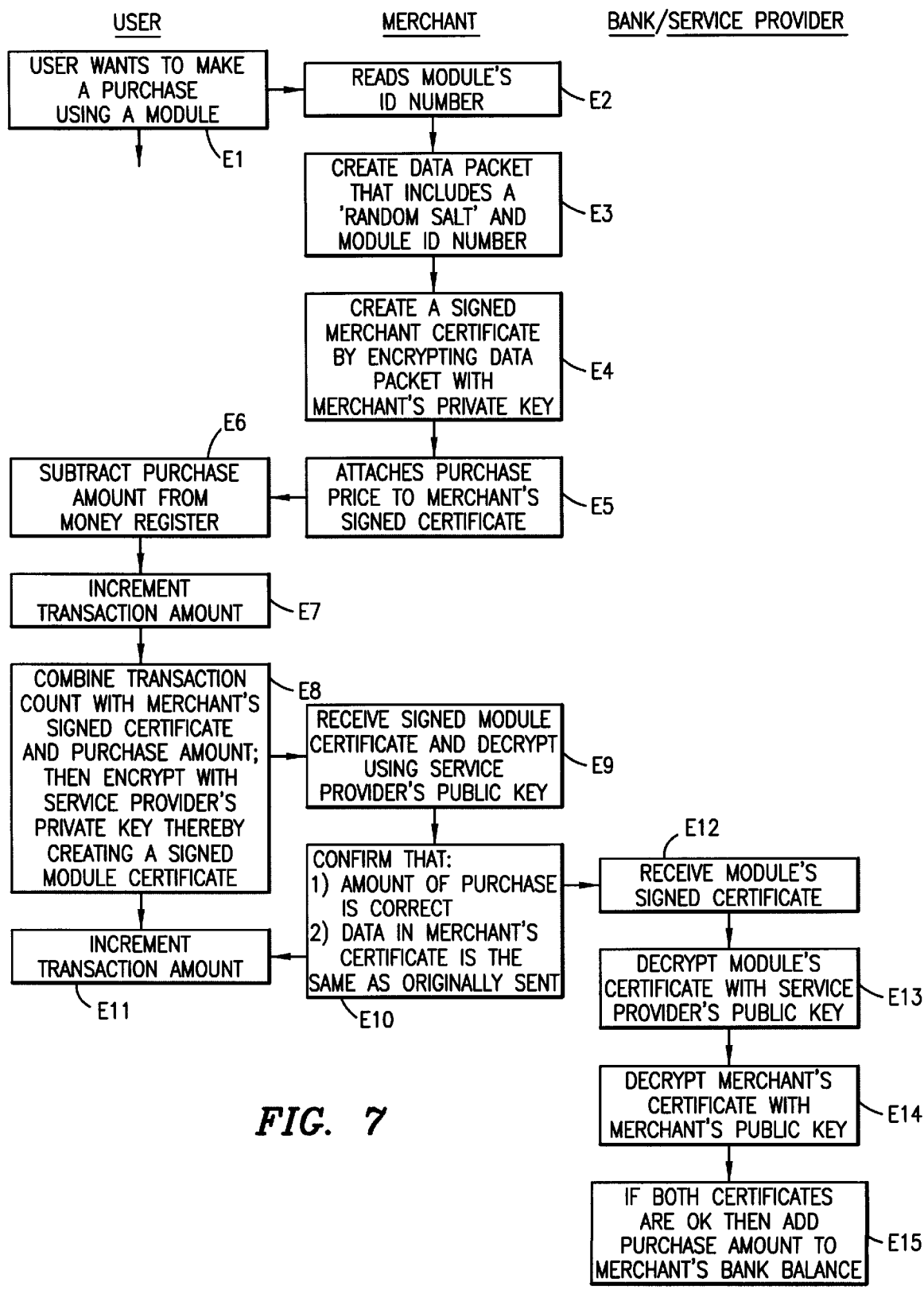
FIG. 7 is an exemplary technique for performing a money transaction using a module.

Monetary transactions using the module 10 and digital certificates are somewhat more complicated because digital data, unlike Federal Reserve Notes, can be copied and duplicated easily. Nevertheless, the use of "SALTs" and transaction sequence numbers can guarantee the authenticity of digital certificates. (In the following discussion, it is assumed that every party to the transaction has its own RSA key set with a private key that it is able to keep secret.)

a. Referring to FIG. 6, the Service Provider (bank) prepares the module 10 by creating a transaction group 40 containing a money object representing the monetary value stored in the module 10. The Service Provider also creates a transaction count object, a modulus object, and an exponent object and stores the provider's private key in the exponent object D1. He privatizes the key so that it cannot be read D2. Next, he stores a transaction script 44 in the transaction group 40 to perform the monetary transaction and locks the group so that no further objects can be made D3, D4. (The details of what this transaction script does are described further below.) Finally, he publishes the corresponding public key widely so that anyone can obtain it D5.

b. The End User receives the module 10 from the Service Provider, and the End User's bank account is debited by the amount stored in the module 10. Using a PC or handheld computer, the End User can interrogate the module 10 to verify that the balance is correct.

c. Referring to FIG. 7, when the End User wishes to purchase some goods or services from a Merchant E1, the Merchant reads the unique lasered registration number of the module and places it in a packet along with a random SALT E2, E3. The merchant then signs this packet with the merchant's own private key E4 and transmits the resulting encrypted packet along with the amount of the purchase to the input data object of the transaction group 40, E5.

d. The Merchant then invokes the transaction script 44 programmed into the module 10 by the Service Provider. This transaction script 44 subtracts the amount of the purchase from the money object E6, appends the value of the transaction counter object to the contents of the input data object E7, signs the resulting packet with the private key, and places the result in the output data object E8.

e. The Merchant then reads the result from the output data object and decrypts it with the Service Provider's public key E9. He then confirms that the amount of the purchase is correct and that the remaining data is identical to the packet he signed in step c., E10.

f. Having confirmed that the certificate provided by the module 10 is both authentic and original (not a duplicate), the Merchant delivers the goods or services E11. Later the Merchant sends the digital certificate to a bank.

g. The bank decrypts the certificate with the Service Provider's public key E12, extracts the amount of the purchase and the transaction count, and decrypts the remaining data with the Merchant's public key to reveal the unique lasered registration number of the module E14. The bank then looks up the module 10 by the unique lasered registration number in a database to confirm that the transaction count for this transaction has not been submitted before. When this test is passed, the bank adds the transaction count value to the database, and then increases the Merchant's bank balance by the amount of the purchase E15. The fact that portions of the certificate were signed by both the module 10 and the Merchant confirms that the transaction was freely agreed to by both the Merchant and the module 10.

Note that there are many different ways of combining data combinations of the transaction counter value, the unique lasered registration number, the random SALT provided by payee, and the amount of purchase, encrypted by the module's private key, the Merchant's private key, or both. Many of these combinations can also provide satisfactory guarantees of uniqueness, authenticity, and irrepudiability, and the design of the firmware allows the Service Provider flexibility in writing the transaction script 44 to serve his particular needs.

D. DIGITAL CASH REPLENISHMENT

Figure 8:
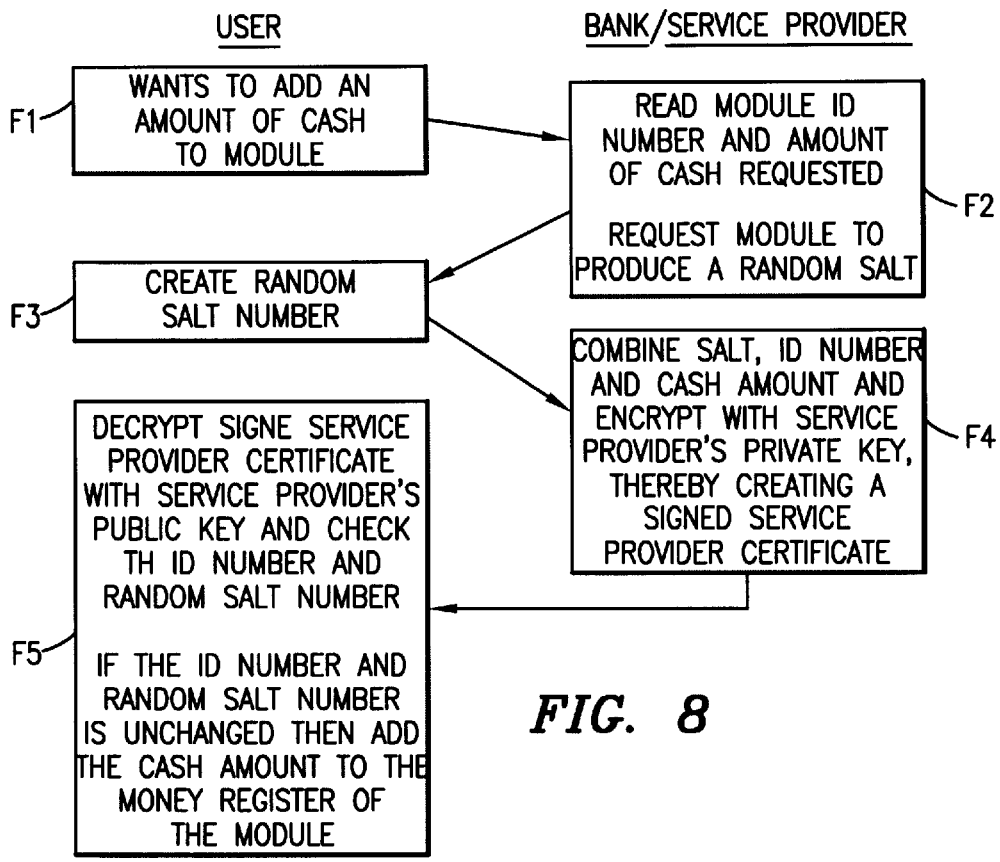
FIG. 8 is an exemplary technique for performing a money transaction using a module.

The discussion of a digital cash purse is section II.C., above, did not address the issue of cash replenishment. The Service Provider can add cash replenishment capability to the module 10, as discussed in section II.C., simply by adding another modulus object and exponent object containing the Service Provider's public key, a random SALT object, and a transaction script 44 for adding money to the balance. The Service Provider can add money to a module 10 either in person or remotely over a network. The process of adding money is as follows:

1. Referring to FIG. 8, the Service Provider reads the unique lasered registration number (ID number) of the module F1, F2 and calls on a transaction script 44 to return the value of a random SALT object. The module 10 calculates a new random SALT value from the previous value and the random number generator and returns it to the Service Provider F3.

2. The Service Provider places the random SALT returned by the module 10 in a packet along with the amount of money to be added and the unique lasered registration number of the module 10 and then encrypts the resulting packet with the Service Provider's private key F4. This encrypted packet is then written back into the input data object of the transaction group 40.

3. The Service Provider invokes a transaction script 44 which decrypts the contents of the input data object with the Service Provider's public key and then checks the unique lasered registration number and the value of the random SALT against the one that it originally provided. If the SALT matches, the money amount is extracted from the packet and added to the value of the money object in the module F5.

Note that the inclusion of the unique lasered registration number is not strictly necessary, but it is included to insure that the Service Provider knows exactly which module is receiving the funds.

E. EXEMPLARY DESCRIPTION OF DIRECT TRANSFER OF FUNDS BETWEEN MODULES

Section II.C.2.g. above reveals a problem that occurs when the Merchant returns the digital certificates to his bank for crediting to his account. The Merchant's bank must either send the certificates back to the Service Provider for redemption, or have access to the Service Provider's records in a database so that it can determine whether the value of the transaction count object is unique. This is inconvenient and requires infrastructure. It also prevents any of the transactions from being anonymous (as they would have been if cash had been used), because the Merchant's bank must log used certificate numbers into a database to prevent them from being reused. These problems can all be eliminated by making use of fund transfers between modules. In addition, the steps required to accomplish a fund transfer between modules are considerably simpler than those described in section II.C.2.

Figure 9:
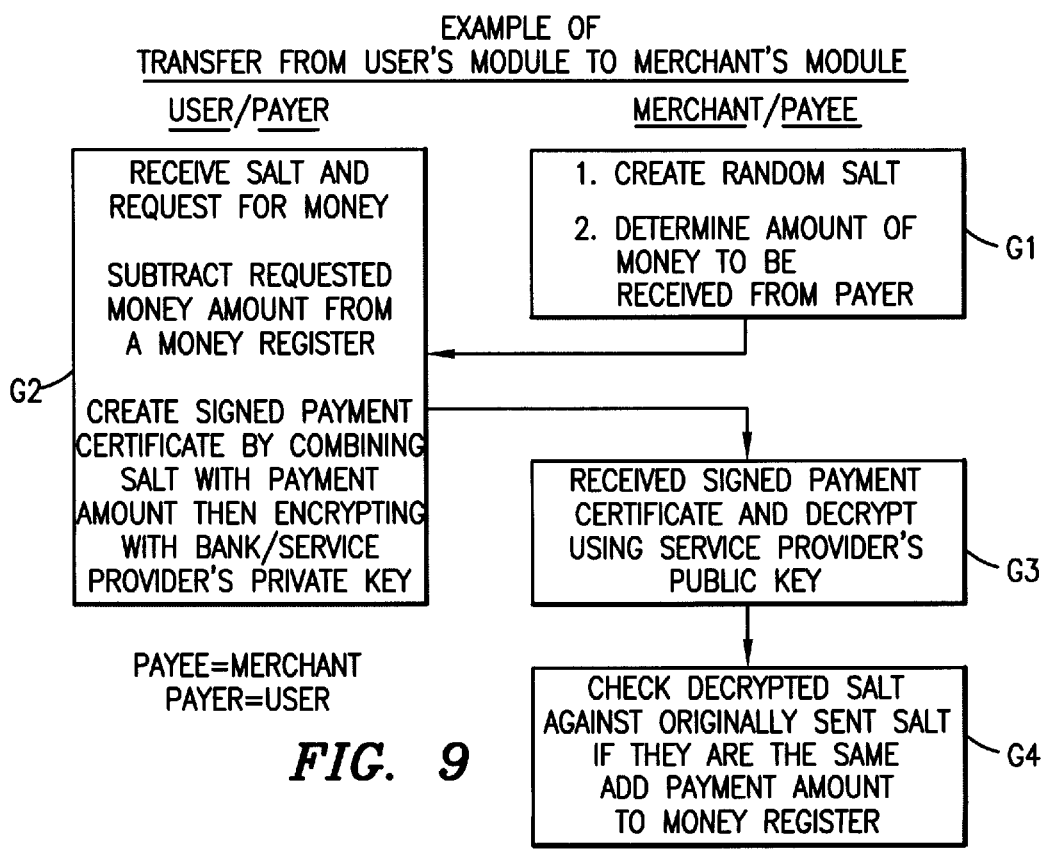
FIG. 9 is an exemplary technique for performing a money transaction using a module.

In the discussion which follows, it is assumed that the Merchant also has a module which he uses to collect the funds received from End Users (customers). The module in the possession of the End User will be called the Payer, and the module in the possession of the Merchant will be called the Payee. The steps to accomplish the funds transfer are as follows:

1. Referring to FIGS. 9, 11 and 12, using his computer, the Merchant calls on a transaction script 44 in the Payee to provide a random SALT. He reads this SALT from the output object of the transaction group 40.

2. The Merchant copies the SALT and the amount of the End User's purchase to the input data object of the Payer G1, then calls on a transaction script 44 in the Payer to subtract the amount of the purchase from the balance, combine the Payee's SALT in a packet with the amount of the purchase, encrypt the resulting package with the Service Provider's private key, and return it in the output data object G2.

3. The Merchant then reads this packet and copies it to the input data object of the Payee, then calls on a transaction script 44 in the Payee to decrypt the packet with the Service Provider's public key G3 and check the SALT against the one originally generated by the Payee. If they agree, the Payee adds the amount of the purchase to its balance G4.

This completes the funds transfer. Note that this transaction effectively transferred the amount of the purchase from the Payer to the Payee, and the steps of the transaction were much simpler than the three-way transaction described in II.C.2. The Merchant can transfer the balance to his bank account by a similar transaction in which the bank provides a SALT to Merchant's module and the Merchant's module prepares a certificate for the balance which it delivers to the bank. Use of a module by the Merchant to collect funds simplifies the transaction, eliminates the need for a database to confirm uniqueness, and preserves the anonymity of the End User that would normally result from a cash transaction.

F. EXEMPLARY TRANSACTIONS WITH A MODULE OVER A NETWORK

The transactions described in section II.C.2., II.D. and II.E. above could also be performed over a network, allowing a physical separation between the Merchant, End User, and modules. However, this could produce a potential problem because one of the communications to the module 10 is unencrypted and therefore subject to falsification. To avoid this problem, both parties must produce a SALT so that the other can demonstrate its ability to encrypt the SALT with the Service Provider's private key and therefore prove authenticity. The operation of this protocol is described as follows as it relates to the transfer of funds between modules (section II.E. above). This method can be employed to allow any of the transactions described above to take place over a network. This clearly enables secure electronic commerce over the Internet.

Figure 10:
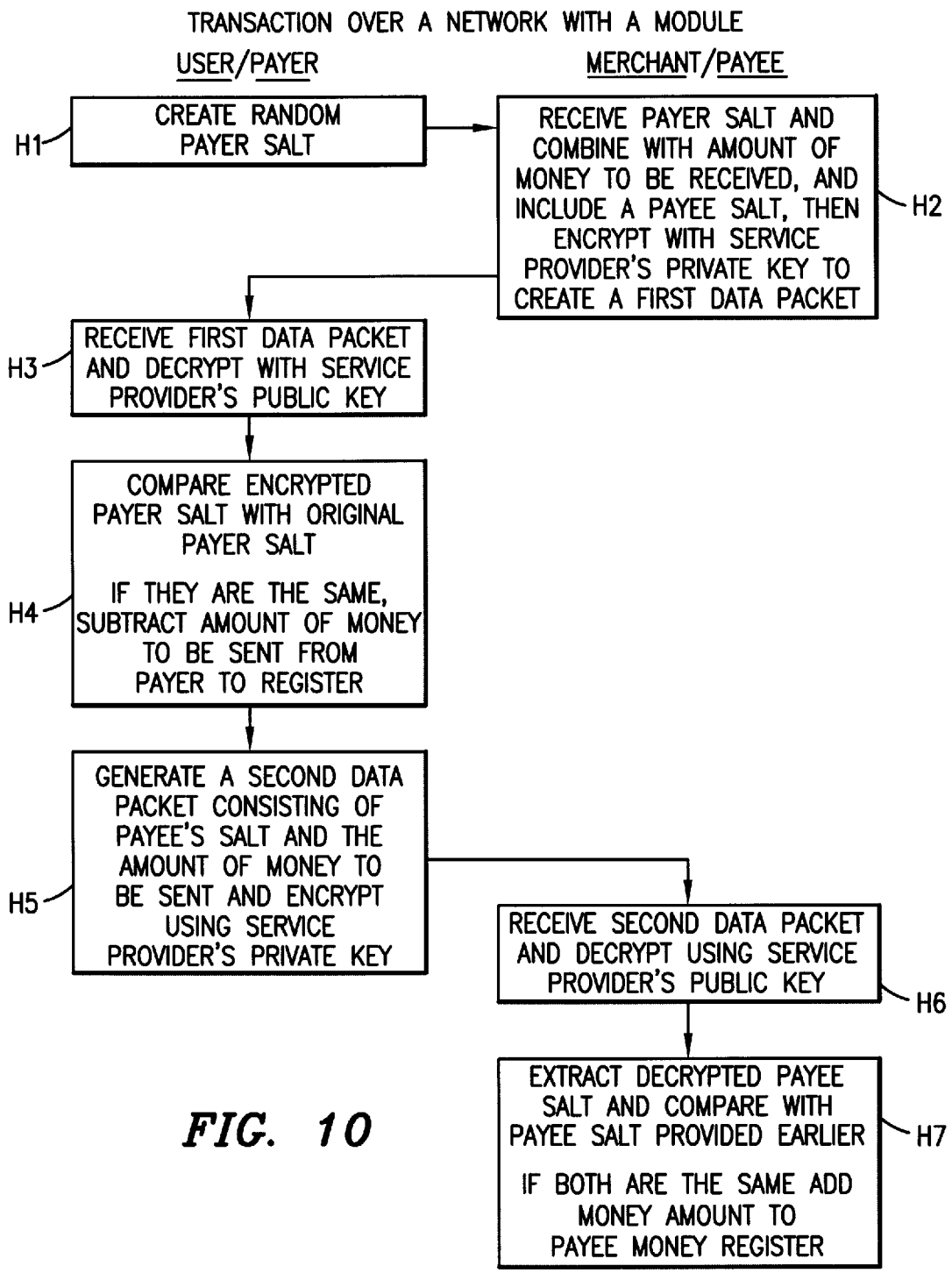
FIG. 10 is an exemplary technique for passing data over a network.

1. Referring to FIG. 10, 11 and 12, the Payer generates a random SALT and transmits it over the network to the Payee H1.

2. The Payee appends the amount of the purchase to the Payer's SALT, followed by a SALT randomly generated by the Payee. The Payee then encrypts this packet with the Service Provider's private key and sends it back to the Payer H2.

3. The Payer decrypts the packet with the Service Provider's public key H3, extracts the Payer SALT, and compares it with the SALT that the Payer provided in step 1. If they agree, the Payer subtracts the amount of the purchaser from its balance H4 and generates a certificate consisting of the amount of the purchase and the Payee's SALT, which it encrypts with the Service Provider's private key and returns to the Payee H5.

4. The Payee decrypts the packet with the Service Provider's public key H6, extracts the Payee SALT, and compares it with the SALT that the Payee provided in step 2. If they agree, the Payee adds the amount of the purchase to its balance H7.

The exchange of SALTs allows each module to confirm that it is communicating with another module, and that the funds transfer requested is therefore legitimate. The SALT comparison described in step 3 allows the Payer to confirm that the Payee is a legitimate module 10 before the funds are withdrawn, and the comparison described in step 4 allows the Payee to confirm that the Payer is a legitimate module 10 before the funds are deposited. The transactions described above provide the minimum necessary information in the encrypted packets to confirm that the funds are being transferred from one module 10 to another. Other information, such as the unique lasered registration number, could be included (at the cost of anonymity) to provide additional information and greater control over the transaction.

G. AN EXEMPLARY TECHNIQUE FOR SOFTWARE AUTHORIZATION AND USAGE METERING

The module 10 is well-suited for the tasks of enabling specific software features in a comprehensive software system and for metering usage of those features. (This usage model parallels the previously described model for withdrawing money from a module 10.)

1. Preparation

Referring to FIGS. 11 and 12, the Service Provider creates a transaction group 40 and stores a configuration object in the group detailing which software within the module 10 the End User is allowed to use. The Service Provider also creates a money object containing the allowed usage credit (which could be in units of time rather than the actual dollar amount), and stores and privatizes a private RSA key pair to use for authentication. A transaction script 44 is stored to receive a SALT and the amount to withdraw from the End User, decrement the balance by the amount withdrawn, and output an RSA signed certificate containing the amount withdrawn, the sale, and the value of the configuration object.

2. Usage

At periodic intervals during the use of the software within the module 10, the PC program generates a random SALT and an amount to charge for the use of the module 10 and transmits this information to the module 10. The module 10 decrements the balance and returns the certificate. The PC decrypts the certificate and confirms that the SALT is the same, the amount withdrawn is correct, and the use of the software within the module 10 is authorized by the information stored in the configuration object. If all of these tests are successful, the module 10 executes for a specified period of time or for a given number of operations before asking the module 10 for another certificate.

There are many possible variations on this usage model. For example, the transaction script 44 could also bind up the true time in the certificate so that the application program running on the PC could guarantee that the execution time is accurately measured. (This would require the Service Provider to create a clock offset object during initialization to provide a reference for measuring time.)

H. SIMULATION OF TRANSACTION TOUCH MEMORY™

This usage model describes how the module 10 can be used to simulate the behavior of the simpler Transaction Touch Memory™ (DS 1962) (hereinafter "TTM") or any similar device or substitute that can operate in a nearly equivalent or similar fashion. The principal feature of the TTM is that there is a counter associated with a block of memory in such a way that the counter is incremented automatically whenever the contents of the memory block are changed.

1. Preparation

This simple feature can be programmed into the module 10 by creating a configuration object, a transaction counter object, and a transaction script object which combines the contents of the input object with the value of the transaction counter object and places them in the configuration object, incrementing the counter automatically in the process. All three objects 42 are locked, but none are privatized.

2. Usage

To add or remove money, the End User reads the values of the configuration object and the transaction counter object directly, then decrypts the configuration object and checks the transaction count from the decrypted package against the value of the counter object. The End User also checks the unique lasered registration number from the encrypted packet against the registration number of the module 10. If these both agree, the balance is considered valid. An amount is added to or subtracted from the balance, the transaction count is incremented, and the packet is re-encrypted and stored in the input data object. The transaction script 44 is then invoked to move the data and the transaction counter value to the configuration object, automatically incrementing the counter value in the process. (The transaction script 44 guarantees that the counter object's value will be incremented anytime data in the configuration object is changed.)

This simple operation can be performed relatively quickly since the module 10 does not have to perform any encryption itself. However, as with the TTM, the End User must now use a secure computing facility to perform the encryption and decryption operations. This usage is therefore less protected than those which depend on the module's encryption capabilities.

I. EXEMPLARY TECHNIQUE FOR POSTAL METERING SERVICE

This usage model describes an application in which the module 10 is used to dispense postage certificates. The digital information which constitutes the certificate is printed on the envelope in the form of a two-dimensional barcode which can be read and authenticated by the Service Provider (U.S.P.S.). A computer program running on an ordinary PC attached to a laser printer in combination with the module 10 can be used to print the postage certificates.

1. Preparation

The Service Provider creates a group containing a money register, a private RSA key (exponent object and modulus object) common to every module, and a transaction script 44. The script 44 combines the SALT and the amount to be withdrawn (provided by the End User's computer) with the unique lasered registration number of the module 10, encrypts this packet with the private key, subtracts the amount withdrawn from the balance, and places the encrypted certificate in the output object where it can be read by the PC.

The Service Provider initializes the balance with a specific amount of money, locks the balance and script 44, privatizes the RSA key objects, and locks the group so that no more scripts can be added. The modules prepared in this way can then be sold over the counter for use with PC-based postage metering programs.

2. Usage

When the first envelope is to be printed, the PC program prepares the first SALT by calculating a one-way hash (e.g., the Secure Hash Standard, FIBS PUB 180) of the date and the unique lasered registration number of the part. This information is passed to the module 10 along with the amount of postage to be withdrawn. The resulting certificate is printed in the two-dimensional barcode along with the hash generation number (one for the first hash), the unique lasered registration number, the plaintext denomination of the stamp, the date, and other information as desired to identify the End User. Subsequent SALTs are generated by performing the one-way hash again on the previous SALT and incrementing the hash generation number.

When the Service Provider receives the envelopes, most of them are taken at face value and the digital barcode is not read. However, a statistical sampling of the barcodes are read and the information provided is decrypted with the public key and verified. Discrepancies are investigated, and fraud is prosecuted under existing law. Verification is possible because the Service Provider can recreate the SALT from the unique lasered registration number, date, and hash generation number, and thereby verify that the transaction is not only current but also linked to a specific module 10.

Note that there are many possible variations on the method described above, leading to similar results. The most likely fraud would be duplication, in which a user captures the digital information sent to the printer to produce the postage certificate and makes many duplicate copies of the same certificate. This could be detected easily by the Service Provider simply by reading the hash generation number and unique registration number and looking them up in a database to make sure that the user is not duplicating the same certificate. (This check could be performed more often than full certificate verification, which would require RSA decryption.)

J. SUBSCRIPTION INFORMATION SERVICE

This usage model describes an application in which a Service Provider makes available information in encrypted form over the internet to users who have agreed to pay for such information. This application works exactly the same way as the Secure E-mail usage model described in section A above, except that the Service Provider bills the user for the encrypted information that the Service Provider e-mails to him. The billing information is obtained from a registry of pubic RSA keys which allows the Service Provider to identify and bill a user, based on his public key or on the unique lasered serial number of his module 10.

K. REGISTRY WITH GUARANTEED PRIVATE KEY SECURITY

In order to provide Merchants with an independent confirmation of the identity of an End User, a Service Provider may wish to maintain a registry containing the pubic key of a particular module 10 along with the name, address, and other identifying information of the person to whom the module 10 is issued. For this purpose, it is essential for the Service Provider to make sure that the public key in the registry corresponds to a private key which is known only to the module 10. In order to guarantee this, the module 10 must be in the possession of the Service Provider at the time the public key is extracted from the module 10 and placed in the registry. After recording this information in the registry, the Service Provider can ship the module 10 to the End User named in the registry.

It is also important for the End User to be able to confirm, when he receives the module 10, that the private key is not known to the Service Provider or any of the Service Provider's employees. This is important because an ideal registry system should not require that any party trust any other party. The system works to everyone's satisfaction only when each party can be convinced that none of the other parties could possibly know the private key.

One way to accomplish this, the Service Provider sends a command to the module 10 to cause it to generate a complete RSA key set using random numbers, and then to automatically make one of the exponents private, so that there is no way any person can discover the value of the private key. This key set has a special type, different from that of a key set programmed into the can by a Service Provider, so that anyone doing business directly with the module 10 can determine for themselves that the private key is known only to the module 10.

1. Preparation

The Service Provider creates a password-protected transaction group 40 for the application, and then creates an RSA key set in the group that is generated by the module 10. (After generating the key set, the modulus and one exponent will be locked automatically, while the second exponent will be privatized automatically by the firmware of the module 10. The Service Provider then creates a transaction script 44 which will encrypt data from the input object with the private key and place the encrypted result in the output object. The transaction script 44 might optionally append additional information (e.g., the transaction counter) to the data from the input object, in order to satisfy any additional objectives of the application. Other objects 42 and transaction scripts 44 may also be added at the discretion of the Service Provider. The transaction group 40 is locked by the Service Provider when it is complete.

Next, the Service Provider reads the RSA modulus and public exponent from the transaction group 40 and records them in the registry along with the information identifying the End User. Finally, the Service Provider ships the module 10 to the End User, and later conveys to the End User the password that can be used to access the transaction group 40.

2. Usage

When a Merchant wishes to obtain positive identification of an End User over the Internet or other network, the Merchant generates a unique packet of data and transmits it to the End User, and the End User passes the data into the input object and invokes the transaction script 44 which causes it to be encrypted with the private key generated by the module 10. The resulting encrypted packet is transmitted back to the Merchant. The Merchant then accesses the data base provided by the Service Provider to obtain the public key belonging to the End User, and attempts to decrypt the encrypted packet using the End User's public key. If the decryption succeeds, the Merchant has proven the physical presence of the End User's module 10 at the remotely networked location. By guaranteeing the presence of the End User's module 10 at the remote site, this identification validates and legitimizes the contents of the data packet and therefore also any financial transactions, represented by the contents of the packet, that may be requested by the End User.

The model described here is one in which the authority to perform financial transactions derives from the registry maintained by the Service Provider. It is therefore essential that this information be accurate and that the private key in the module 10 can be secure from all parties. Because each module 10 has its own unique RSA key set, there is no provision in this model for the module 10 to represent money independently of the registry maintained by the Service Provider. Instead, the registry and the ability of the module 10 to sign with its private key together serve as a definitive means of identifying the End User remotely to any other party.

L. TAXATION OF TRANSACTION VOLUME

This usage applies to a business model in which the Service Provider intends to collect a service charge from the End User that is a percentage of the total amount of money transferred by the module 10. This model is similar to those described in sections C D, E, and F above, but with the addition of a destructor object that can cause any particular transaction script 44 to expire at a predetermined date and time. This model also requires the use of an additional money object which is programmed (with a suitable transaction script 44) to accumulate the total value of all the money passed out of the module 10.

1. Preparation

The Service Provider creates a transaction group 40 containing money objects, etc. as described in sections D and E above. The Service Provider also creates an additional money object to serve as the volume accumulator. The Service Provider also creates transaction scripts 44 for withdrawing or depositing money as in D and E, except that the transaction script for adding money to the module 10 includes a destructor object set to expire at a predetermined time in the future, and the transaction script 44 for withdrawing money includes an instruction to add the amount of the withdrawal to the money object serving as the volume accumulator. The service provider then locks the group and ships the module 10 to the End User.

2. Usage

The End user uses the module 10 for deposits and withdrawals as described in sections D and E above. During the time that the module 10 is used, the cumulative total of all the money spent from the module 10 is accumulated in the money object serving as the volume accumulator. When the time limit expires, the End User can no longer add money to his module 10, although he can continue to withdraw money if desired until there is none left. The End User then returns the module 10 to the Service Provider to be restored. The Service Provider reads the remaining amount of money and also the amount of money recorded in the volume accumulator. The Service Provider bills the End User a service charge that is a percentage of the amount in the volume accumulator. If the End User is willing to pay this amount to continue his service, the transaction group 40 is destroyed and rebuilt, then the amount of money remaining in the module 10 when the End User returned it is programmed back into the money object of the transaction group 40. The Service Provider then returns the restored module to the End User, provided that the End User pays the service charge.

The system described above allows a Service Provider to collect periodic fees for service without having to monitor and be involved in every financial transaction performed by the End user. The fee is based on actual usage, as determined by the contents of the volume register.

Exemplary Firmware Definitions for Use With the Module

Object The most primitive data structure accepted by and operated on by the modules firmware. A list of valid objects and their definitions is provided in the next section.

Group A self-contained collection of objects. An object's scope is restricted to the group of which it is a member.

Group ID A number preferably between 0 and 255 representing a specific group.

Object ID A number preferably between 0 and 255 representing a specific object within a specific group.

Object Type Preferably a 1-byte type specifier that describes a specific object.

PIN An alphanumeric Personal Identification number that is preferably eight bytes in length.

Common PIN The PIN that controls access to shared resources such as the audit trail. It is also used to control the host's ability to create and delete groups.

Group PIN The PIN that controls access to operations specific to objects within a group.

Audit Trail A record of transactions occurring after the module has been locked.

Locked Object An object which has been locked by executing the lock object command. Once an object is locked it is not directly readable.

Private Object An object which has been privatized by executing the privatize object command. Once an object is private, it is not directly readable or writable.

Locked Group A group which has been locked using the locked group command. After a group has been locked it will not allow object creation.

Composite Object A combination of several objects. The individual objects inherit the attributes of the composite object.

Exemplary Object Definitions

RSA Modulus A large integer preferably of at most 1024 bits in length. It is the product of 2 large prime numbers that are each about half the number of bits in length of the desired modulus size. The RSA modulus is used in the following equations for encrypting and decrypting a message M:

$$\text{Encryption: } C = M^e \pmod{N} \qquad (1)$$

$$\text{Decryption: } M = C^d \pmod{N} \qquad (2)$$

where C is the cyphertext, d and e are the RSA exponents (see below), and N is the RSA modulus.

RSA Exponent Both e and d (shown in equations 1 and 2 above) are RSA exponents. They are typically large numbers but are smaller than the modulus (N). RSA exponents can be either private or public. When RSA exponents are created in the module, they may be declared as either. Once created an exponent may be changed from a public exponent to a private exponent. After an exponent has been made private, however, it will remain private until the transaction group 40 to which it belongs is destroyed.

Transaction Script A transaction script is a series of instructions to be carried out by the module. When invoked the module firmware interprets the instructions in the script and places the results in the output data object (see below). The actual script is simply a list of objects. The order in which the objects are listed specifies the operations to be performed on the objects. transaction scripts 44 preferably may be as long as 128 bytes.

Transaction Counter The transaction counter object is preferably 4 bytes in length and is usually initialized to zero when it is created. Every time a transaction script, which references this object, is invoked, the transaction counter increments by 1. Once a transaction counter has been locked it is read only and provides an irreversible counter.

Money Register The money register object is preferably 4 bytes in length and may be used to represent money or some other form of credit. Once this object has been created, it must be locked to prevent a user from tampering with its value. Once locked the value of this object can be altered only by invoking a transaction script. A typical transaction group 40 which performs monetary transactions might have one script for withdrawals from the money register and one for deposits to the money register.

Clock Offset This object is preferably a 4 byte number which contains the difference between the reading of the module's real-time clock and some convenient time (e.g., 12:00 a.m., Jan. 1, 1970). The true time can then be obtained from the module by adding the value of the clock offset to the real-time clock.

SALT A SALT object is preferably 20 bytes in length and should be initialized with random data when it is created. When a host transmits a generate random SALT command, the module combines the previous SALT with the module's random number (produced preferably by randomly occurring power-ups) to generate a new random SALT. If the SALT object has not been privatized it may subsequently be read by issuing a read object command.

Configuration Data This is a user defined structure with preferably a maximum length of 128 bytes. This object is typically used to store configuration information specific to its transaction group 40. For example, the configuration data object may be used to specify the format of the money register object (i.e., the type of currency it represents). Since this object has no pre-defined structure, it may never be used by a transaction object.

Input Data An input data object is simply an input buffer with preferably a maximum length of 128 bytes. A transaction group may have multiple input objects. The host uses input data objects to store data to be processed by transaction scripts 44.

Output Data The output data object is used by transaction scripts as an output buffer. This object is automatically created when the transaction group is created. It is preferably 512 bytes in length and inherits password protection from its group.

Random Fill When the script interpreter encounters this type of object it automatically pads the current message so that its length is 1 bit smaller than the length of the preceding modulus. A handle to this object is automatically created when the transaction group is created. It is a private object and may not be read using the read object command.

Working Register This object is used by the script interpreter as working space and may be used in a transaction script. A handle to this object is automatically created when the transaction group is created. It is a private object and may not be read using the read object command.

ROM Data This object is automatically created when the transaction group is created. It is a locked object and may not be altered using the write object command. This object is 8 bytes and length and its contents are identical to the 8 by ROM data of the Micro-In-A-Can™.

Preferred Module Firmware Command Set
Set Common PIN(01H)
Transmit (to module)
01H, old PIN, new PIN, PIN option byte
Receive data
CSB (command status byte)=0 if successful, appropriate error code otherwise
Output length=0
Output Data=0
Notes:
The PIN option byte may be the bitwise-or of any of the following values:
PIN_TO_ERASE 00000001b (require PIN for Master Erase)
PIN_TO_CREATE 00000010b (require PIN for group creation).

Initially the module has a PIN (Personal Identification Number) of 0 (Null) and an option byte of 0. Once a PIN has been established it can only be changed by providing the old PIN or by a Master Erase. However, if the PIN_TO_ERASE bit is set in the option byte, the PIN can only be changed through the set common PIN command.

Possible error codes for the set common PIN command:
ERR_BAD_COMMON_PIN (Common PIN match failed)
ERR_BAD_PIN_LENGTH (New PIN length>8 bytes)
ERR_BAD_OPTION_BYTE (Unrecognizable option byte)

For all commands described in this section, data received by the host will be in the form of a return packet. A return packet has the following structure:
Command status byte (0 if command successful, error code otherwise, 1 byte)
Output data length (Command output length, 2 bytes)
Output data (Command output, length specified above).
Master Erase (02H)
Transmit data
02H, Common PIN
Receive data
CSB=0 if command was successful, ERR_BAD_COMMON_PIN otherwise
Output length=0
Output data=0
Notes:
If the LSB (least significant bit) of the PIN option is clear (i.e. PIN not required for Master Erase) then a 0 is transmitted for the Common PIN value. In general this text will always assume a PIN is required. If no PIN has been established a 0 should be transmitted as the PIN. This is true of the common PIN and group PINS (see below). If the PIN was correct the firmware deletes all groups (see below) and all objects within the groups. The common PIN and common PIN option byte are both reset to zero.

After everything has been erased the module transmits the return packet. The CSB is as described above. The output data length and output data fields are both set to 0.

Create Group (03H)
Transmit data
03H, Common PIN, Group name, Group PIN
Receive data
CSB=0 if command successful, appropriate error code otherwise
Output length=1 if successful, 0 otherwise
Output data=Group ID if successful, 0 otherwise
Notes:
The maximum group name length is 16 bytes and the maximum PIN length is eight bytes. If the PIN_TO_CREATE bit is set in the common PIN option byte and the PIN transmitted does not match the common PIN the module will set the OSC to ERR_BAD_COMMON_PIN.
Possible error return codes for the create group command:
ERR_BAD_COMMON_PIN (Incorrect common PIN)
ERR_BAD_NAME_LENGTH (If group name length>16 bytes)
ERR_BAD_PIN_LENGTH (If group PIN length>8 bytes)
ERR_MIAC_LOCKED (The module has been locked)
ERR_INSUFFICIENT_RAM (Not enough memory for new group)
Set Group PIN (04H)
Transmit data
04H, Group ID, old GPIN, new GPIN
Receive data
CSB=0 if command successful, appropriate error code otherwise
Output length=0
Output data=0
Notes:
The Group PIN only restricts access to objects within the group specified by the group ID transmitted in the command packet.
Possible error codes for the set group PIN command:
ERR_BAD_GROUP_PIN (Group PIN match failed)
ERR_BAD_PIN_LENGTH (New group PIN length>8 bytes)
Create Object (05H)
Transmit data
05H, Group ID, Group PIN, Object type, Object attributes, Object data
Receive data
CSB=0 if command successful, appropriate error code otherwise
Output length=1 if successful, 0 otherwise
Output data=object ID if successful, 0 otherwise
Notes:
If the Create Object command is successful the module firmware returns the object's ID within the group specified by the Group ID. If the PIN supplied by the host was incorrect or the group has been locked by the Lock Group command (described below) the module returns an error code in the CSB. An object creation will also fail if the object is invalid for any reason. For example, if the object being created is an RSA modulus (type 0) and it is greater than 1024 bits in length. transaction script creation will succeed if it obeys all transaction scripts rules.
Possible error return codes for the create object command:
ERR_BAD_GROUP_PIN (Incorrect group PIN)
ERR_GROUP_LOCKED (The group has been locked)
ERR_MIAC_LOCKED (The module has been locked)
ERR_INVALID_TYPE (The object type specified is invalid)
ERR_BAD_SIZE (The objects length was invalid)
ERR_INSUFFICIENT_RAM (Not enough memory for new object)

Object types:
RSA modulus 0
RSA exponent 1
Money register 2
Transaction counter 3
Transaction script 4
Clock offset 5
Random SALT 6
Configuration object 7
Input data object 8
Output data object 9
Object Attributes: Locked 00000001b
Privatized 00000010b Objects may also be locked and privatized after creation by using the Lock Object and Privatize Object commands described below.

Lock Object (06H)
Transmit data
06H, Group ID, Group PIN, Object ID
Receive data
CSB=0 if command successful, appropriate error code otherwise
Output length=0
Output data=0
Notes:
If the Group ID, Group PIN and Object ID are all correct, the module will lock the specified object. Locking an object is an irreversible operation.

Possible error return codes for the lock object command:
ERR_BAD_GROUP_PIN (Incorrect group PIN)
ERR_GROUP_LOCKED (The group has already been locked)
ERR_MIAC_LOCKED (The module has been locked)
ERR_BAD_GROUP_ID (Specified group does not exist)
ERR_BAD_OBJECT_ID (Specified object does not exist)

Privatize Object (07H)
Transmit data
07H, Group ID, Group PIN, Object ID
Receive data
CSB=0 if successful, appropriate error code otherwise
Notes:
If the Group ID, Group PIN and Object ID were valid the object will be privatized. Privatized objects share all the properties of locked objects but are not readable. Privatized objects are only modifiable through transaction scripts. Note that locking a privatized object is legal, but has no meaning since object privatization is a stronger operation than object locking. Privatizing an object is an irreversible operation.

Possible error return codes for the privatize object command:
ERR_BAD_GROUP_PIN (Incorrect group PIN)
ERR_GROUP_LOCKED (The group has already been locked)
ERR_MIAC_LOCKED (The module has been locked)
ERR_BAD_GROUP_ID (Specified group does not exist)
ERR_BAD_OBJECT_ID (Specified object does not exist)

Make Object Destructable (08H)
Transmit data
08H, Group ID, Group PIN, Object ID
Receive data
CSB=0 if successful, appropriate error code otherwise
Notes:
If the Group ID, Group PIN and Object ID were valid the object will be made destructable. If an object is destructable it becomes unusable by a transaction script after the groups destructor becomes active. If no destructor object exists within the transaction group the destructible object attribute bit has no affect. Making an object destructable is an irreversible operation.

Possible error return codes for the make object destructable command:
ERR_BAD_GROUP_PIN (Incorrect group PIN)
ERR_GROUP_LOCKED (The group has already been locked)
ERR_MIAC_LOCKED (The module has been locked)
ERR_BAD_GROUP_ID (Specified group does not exist)
ERR_BAD_OBJECT_ID (Specified object does not exist)

Lock Module (09H)
Transmit data
09H, Common PIN
Receive data
CSB=0 if successful, appropriate error code otherwise
Output length=2 if successful, 0 otherwise
Output data=audit trail size if successful, 0 otherwise
Notes:
If the host supplied Common PIN is correct and the module has not previously been locked, the command will succeed. When the module is locked it will not accept any new groups or objects. This implies that all groups are automatically locked. The RAM not used by the system or by groups will be used for an audit trail. There is no audit trail until the module has successfully been locked!

An audit trail record is six bytes long and has the following structure:

Group ID|Object ID|Date/Time stamp.

Once an audit trail has been established, a record of the form shown above will be stored in the first available size byte location every time a transaction script is executed. Note that since the module must be locked before the audit trail begins, neither the group ID nor any object ID is subject to change. This will always allow an application processing the audit trail to uniquely identify the transaction script that was executed. Once the audit trail has consumed all of its available memory, it will store new transaction records over the oldest transaction records.

Possible error codes for the lock module command:
ERR_BAD_COMMON_PIN (Supplied common PIN was incorrect)
ERR_MIAC_LOCKED (Module was already locked)

Lock Group (0AH)
Transmit data
0AH, Group ID, Group PIN
Receive data
CSB=0 if command successful, appropriate error code otherwise
Output length=0
Output data=0

Notes:

If the group PIN provided is correct the module BIOS will not allow further object creation within the specified group. Since groups are completely self-contained entities they may be deleted by executing the Delete Group command (described below).

Possible error return codes for the lock group command:

ERR_BAD_GROUP_PIN (Incorrect group PIN)

ERR_GROUP_LOCKED (The group has already been locked)

ERR_MIAC_LOCKED (The module has been locked)

ERR_BAD_GROUP_ID (Specified group does not exist)

Invoke Transaction Script (0BH)
Transmit data
0BH, Group ID, Group PIN, Object ID
Receive data
CSB=0 if command successful, appropriate error code otherwise
Output length=1 if successful, 0 otherwise
Output data=estimated completion time Notes:

The time estimate returned by the module is in sixteenths of a second. If an error code was returned in the CSB, the time estimate will be 0.

Possible error return codes for the execution transaction script command:

ERR_BAD_GROUP_PIN (Incorrect group PIN)

ERR_BAD_GROUP_ID (Specified group does not exist)

ERR_BAD_OBJECT_ID (Script object did not exist in group)

Read Object (0CH)
Transmit data
0CH, Group ID, Group PIN, Object ID
Receive data
CSB=0 if command successful, appropriate error code otherwise
Output length=object length if successful, 0 otherwise
Output data=object data if successful, 0 otherwise Notes:

If the Group ID, Group PIN and Object ID were correct, the module checks the attribute byte of the specified object. If the object has not been privatized the module will transmit the object data to the host. If the Group PIN was invalid or the object has been privatized the module will return a 0 in the output length, and data fields of the return packet.

Possible error codes for the read object command:

ERR_BAD_GROUP_PIN (Incorrect group PIN)

ERR_BAD_GROUP_ID (Specified group does not exist)

ERR_BAD_OBJECT_ID (Object did not exist in group)

ERR_OBJECT_PRIVATIZED (Object has been privatized)

Write Object (0DH)
Transmit data
0DH, Group ID, Group PIN, Object ID, Object size, Object Data
Receive data
CSB=0 if successful, appropriate error code otherwise
Output length=0
Output data=0

Notes:

If the Group ID, Group PIN and Object ID were correct, the module checks the attribute byte of the specified object. If the object has not been locked or privatized the module will clear the objects previous size and data and replace it with the new object data. Note that the object type and attribute byte are not affected.

Possible error codes for the write object command: ERR_BAD_GROUP_PIN (Incorrect group PIN) ERR_BAD_GROUP_ID (Specified group does not exist)

ERR_BAD_OBJECT_ID (Object did not exist in group)

ERR_BAD_OBJECT-SIZE (Illegal object size specified)

ERR_OBJECT_LOCKED (Object has been locked)

ERR_OBJECT_PRIVATIZED (Object has been privatized)

Read Group Name (0EH)
Transmit data
0EH, Group ID
Receive data
CSB=0
Output Length=length of group name
Output data=group name Notes:

The group name length is a maximum of 16 bytes. All byte values are legal in a group name.

Delete Group (0FH)
Transmit data
0FH, Group ID, Group PIN
Receive data
CSB=0 if successful, appropriate error code otherwise
Output length=0
Output data=0

Notes:

If the group PIN and group ID are correct the module will delete the specified group. Deleting a group causes the automatic destruction of all objects within the group. If the module has been locked the Delete Group command will fail.

Possible error codes for the delete group command:

ERR_BAD_GROUP_PIN (Incorrect group PIN)

ERR_BAD_GROUP_ID (Specified group does not exist)

ERR_MIAC_LOCKED (Module has been locked)

Get Command Status Info (10H)
Transmit data
10H
Receive data
CSB=0
Output length=6
Output data=module status structure (see below)

Notes:

This operation requires no PIN and never fails. The status structure is defined as follows:

Last command executed (1 byte)
Last command status (1 byte)
Time command received (4 bytes)
Get Module Configuration Info (11H)
Transmit data
11H
Receive data
CSB=0

Output length=4

Output data=module configuration structure

Notes:

This operation requires no PIN and never fails. The configuration structure is defined as follows:

Number of groups (1 byte)

Flag byte (see below) (1 byte)

Audit trail size/Free RAM (2 bytes)

The flag byte is the bitwise-or of any of the following values:

00000001b (Module is locked)

00000010b (Common PIN required for access)

Read Audit Trail Info (12H)

Transmit data

12H, Common PIN

Receive data

CSB=0 if command successful, appropriate error code otherwise

Output length=audit trail structure size (S) if successful, 0 otherwise

Output data=audit trail info structure if successful, 0 otherwise

Notes:

If the transmitted Common PIN is valid and the module has been locked, it returns audit trail configuration information as follows:

Number of used transaction records (2 bytes)

Number of free transaction records (2 bytes)

A boolean specifying whether or (1 byte) not the audit trail rolled since previous read command Possible error codes for the read audit trail info command:

ERR_BAD_COMMON_PIN (Common PIN was incorrect)

ERR_MIAC_NOT_LOCKED (Module is not locked)

Read Audit Trail (13H)

Transmit data

13H, Common PIN

Receive data

CSB=0 if command successful, appropriate error code otherwise

Output length # of new records * 6 if successful, 0 otherwise

Output data=new audit trail records

Notes:

If the transmitted common PIN is valid and the module has been locked, it will transfer all new transaction records to the host.

Possible error codes for the read audit trail command:

ERR_BAD_COMMON_PIN (Common PIN was incorrect)

ERR_MIAC_NOT_LOCKED module is not locked

Read Group Audit Trail (14H)

Transmit data

14H, Group ID, Group PIN

Receive data

CSB=0 if command successful, appropriate error code otherwise

Output length # or records for group * 6 if successful, 0 otherwise

Output data=audit trail records for group

Notes:

This command is identical to the read audit trail command, except that only records involving the group ID specified in the transmit data are returned to the host. This allows transaction groups to record track their own activities without seeing other groups records.

Possible error codes for the read group audit trail command:

ERR_BAD_GROUP_ID (Group ID does not exist)

ERR_BAD_GROUP_PIN (Common PIN was incorrect)

ERR_MIAC_NOT_LOCKED (The module is not locked)

Read Real Time Clock (15H)

Transmit data

15H, Common PIN

Receive data

CSB=0 if the common PIN matches and ERR_BAD_COMMON_PIN otherwise

Output length=4

Output data=4 most significant bytes of the real time clock

Notes:

This value is not adjusted with a clock offset. This command is normally used by a service provider to compute a clock offset during transaction group creation.

Read Real Time Clock Adjusted (16H)

Transmit data

16H, Group ID, Group PIN, ID of offset object

Receive data

CSB=0 if successful, appropriate error code otherwise

Output length=4 if successful, 0 otherwise

Output data=Real time clock+clock offset ID

Notes:

This command succeeds if the group ID and group PIN are valid, and the object ID is the ID of a clock offset. The module adds the clock offset to the current value of the 4 most significant bytes of the RTC and returns that value in the output data field. Note that a transaction script may be written to perform the same task and put the result in the output data object.

Possible error codes for the real time clock adjusted command:

ERR_BAD_GROUP_PIN (Incorrect group PIN)

ERR_BAD_GROUP_ID (Specified group does not exist)

ERR_BAD_OBJECT_TYPE (Object ID is not a clock offset)

Get Random Data (17H)

Transmit data

17H, Length (L)

Receive data

CSB=0 if successful, appropriate error code otherwise

Output length=L if successful, 0 otherwise

Output data=L bytes of random data if successful

Notes:

This command provides a good source of cryptographically useful random numbers.

Possible error codes for the get random data command are:

ERR_BAD_SIZE (Requested number of bytes>128)

Get Firmware Version ID (18H)

Transmit data

18H

Receive data

CSB=0

Output length=Length of firmware version ID string

Output data=Firmware version ID string

Notes:

This command returns the firmware version ID as a Pascal type string (length+data).

Get Free RAM (19H)

Transmit data

19H

Receive data

CSB=0

Output length=2

Output data=2 byte value containing the amount of free RAM

Notes:

If the module has been locked the output data bytes will both be 0 indicating that all memory not used by transaction groups has been reserved for the audit trail.

Change Group Name (1AH)

Transmit data

1AH, Group ID, Group PIN, New Group name

Receive data

CSB=0 if successful or an appropriate error code otherwise

Output length=0

Output data=0

Notes:

If the group ID specified exists in the module and the PIN supplied is correct, the transaction group name is replaced by the new group name supplied by the host. If a group ID of 0 is supplied the PIN transmitted must be the common PIN. If it is correct, the module name is replaced by the new name supplied by the host.

Possible error codes for the change group name command:

ERR_BAD_GROUP_PIN (Incorrect group PIN)

ERR_BAD_GROUP_ID (Specified group does not exist)

ERR_BAD_NAME_LENGTH (New group name>16 bytes)

ERROR CODE DEFINITIONS

ERR_BAD_COMMAND (80H)

This error code occurs when the module firmware does not recognize the command just transmitted by the host.

ERR_BAD_COMMON_PIN (81H)

This error code will be returned when a command requires a common PIN and the PIN supplied does not match the module's common PIN. Initially the common PIN is set to 0.

ERR_BAD_GROUP_PIN (82H)

Transaction groups may have their own PIN, FIG. 11. If this PIN has been set (by a set group PIN command) it must be supplied to access any of the objects within the group. If the Group PIN supplied does not match the actual group PIN, the module will return the ERR_BAD_GROUP_PIN error code.

ERR_BAD_PIN_LENGTH (83H)

There are 2 commands which can change PIN values. The set group PIN and the set common PIN commands. Both of these require the new PIN as well as the old PIN. The ERR_BAD_PIN_LENGTH error code will be returned if the old PIN supplied was correct, but the new PIN was greater than 8 characters in length.

ERR_BAD_OPTION_BYTE (84H)

The option byte only applies to the common PIN. When the set common PIN command is executed the last byte the host supplies is the option byte (described in command section). If this byte is unrecognizable to the module, it will return the ERR_BAD_OPTION_BYTE error code.

ERR_BAD_NAME_LENGTH (85H)

When the create transaction group command is executed, one of the data structures supplied by the host is the group's name. The group name may not exceed 16 characters in length. If the name supplied is longer than 16 characters, the ERR_BAD_NAME_LENGTH error code is returned.

ERR_INSUFFICIENT_RAM (86H)

The create transaction group and create object commands return this error code when there is not enough heap available in the module.

ERR_MIAC_LOCKED (87H)

When the module has been locked, no groups or objects can be created or destroyed. Any attempts to create or delete objects will generate an ERR_MIAC_LOCKED error code.

ERR_MIAC_NOT_LOCKED (88H)

If the module has not been locked there is no audit trail. If one of the audit trail commands is executed this error code will be returned.

ERR_GROUP_LOCKED (89H)

Once a transaction group has been locked object creation within that group is not possible. Also the objects attributes and types are frozen. Any attempt to create objects or modify their attribute or type bytes will generate an ERR_GROUP_LOCKED error code.

ERR_BAD_OBJECT_TYPE (8AH)

When the host sends a create object command to the module, one of the parameters it supplies is an object type (see command section). If the object type is not recognized by the firmware it will return an ERR_BAD_OBJECT_TYPE error code.

ERR_BAD_OBJECT_ATTR (8BH)

When the host sends a create object command to the module, one of the parameters it supplies is an object attribute byte (see command section). If the object attribute byte is not recognized by the firmware it will return an ERR_BAD_OBJECT_ATTR error code.

ERR_BAD_SIZE (8CH)

An ERR_BAD_SIZE error code is normally generated when creating or writing an object. It will only occur when the object data supplied by the host has an invalid length.

ERR_BAD_GROUP_ID (8DH)

All commands that operate at the transaction group level require the group ID to be supplied in the command packet. If the group ID specified does not exist in the module it will generate an ERR_BAD_GROUP_ID error code.

ERR_BAD_OBJECT_ID (8EH)

All commands that operate at the object level require the object ID to be supplied in the command packet. If the object ID specified does not exist within the specific transaction group (also specified in the command packet) the module will generate an ERR_BAD_OBJECT_ID error code.

ERR_INSUFFICIENT_FUNDS (8FH)

If a script object that executes financial transactions is invoked and the value of the money register is less than the withdrawal amount requested an ERR_INSUFFICIENT_FUNDS error code will be returned.

ERR_OBJECT_LOCKED (90H)

Locked objects are read only. If a write object command is attempted and it specifies the object ID of a locked object the module will return an ERR_OBJECT_LOCKED error code.

ERR_OBJECT_PRIVATE (91H)

Private objects are not directly readable or writable. If a read object command or a write object command is attempted, and it specifies the object ID of a private object, the module will return an ERR_OBJECT_PRIVATE error code.

ERR_OBJECT_DESTRUCTED (92H)

If an object is destructible and the transaction group's destructor is active the object may not be used by a script. If a script is invoked which uses an object which has been destructed, an ERR_OBJECT_DESTRUCTED error code will be returned by the module.

The exemplary embodiment of the present invention is preferably placed within a durable stainless steel, token-like can. It is understood that an exemplary module can be placed in virtually any articulatable item. Examples of articulatable items include credit cards, rings, watches, wallets, purses, necklaces, jewelry, ID badges, pens, clipboards, etc.

The module preferably is a single chip "trusted computer". By the word "trusted" it is meant that the computer is extremely secure from tampering by unwarranted means. The module incorporates a numeric coprocessor optimized for math intensive encryption. The BIOS is preferably immune to alteration and specifically designed for very secure transactions.

Each module can have a random "seed" generator with the ability to create a private/public key set. The private key never leaves the module and is only known by the module. Furthermore, discovery of the private key is prevented by active self-destruction upon wrongful entry into the module. The module can be bound to the user by a personal identification number (PIN).

When transactions are performed by the module certificates of authentication are created by either or both the module and a system the module communicates with. The certificate can contain a variety of information. In particular, the certificate may contain:

1) who is the module user via a unique registration number.
2) when the transaction took place via a true-time stamping of the transaction.
3) where the transaction took place via a registered module interface site identification.
4) security information via uniquely serialized transactions and digital signitures on message digests.
5) module status indicated as valid, lost, or expired.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for adding a monetary equivalent to an electronic module, comprising the steps of:
   a. placing the module in communication with an electronic device;
   b. indicating an amount requested to said electronic device;
   c. communicating a random number from said module to said electronic device;
   d. combining said random number and said amount requested thereby creating a first data packet in said electronic device;
   e. encrypting said first data packet with a first key thereby creating a signed certificate in said electronic device;
   f. communicating said signed certificate from said electronic device to said module;
   g. decrypting said signed certificate in said module with a second key thereby creating a decrypted random number and a decrypted amount requested;
   h. comparing said random number with said decrypted random number and determining if they match in said module; and
   i. adding said decrypted amount requested to a money register in said module.

2. The method of claim 1, further comprising, after step b, the step of communicating a module identification from said module to said electronic device.

3. The method of claim 2, wherein the step d of combining further comprises the step of combining said module indentification with said random number and said amount requested prior thereby creating said first data packet in said electronic device.

4. The method of claim 3, wherein the step of g of decrypting further comprises the step of creating a decrypted module identification.

5. The method of claim 4, wherein the step h of comparing further comprises the step of comparing said module identification and said decrypted module identification and determining if they match.

6. The method of claim 1, wherein said module is portable.

7. The method of claim 1, wherein said first key is a private key and said second key is a public key.

8. The method of claim 1, wherein said module is programmable.

9. Method of metering a monetary equivalent out of a module and into an electronic equipment, comprising the steps of:
   a. placing said electronic equipment in communication with said module;
   b. reading a module identifier with said electronic equipment;
   c. combining a first random number, a number of units to be metered and said module identifier in said electronic equipment thereby creating a first data packet;
   d. encrypting said first data packet in said electronic equipment with a first key thereby creating an encrypted first data packet;
   e. passing said encrypted first data packet and a requested monetary value from said electronic equipment to said module;
   f. subtracting said requested monetary value from a money register in said module; and
   g. incrementing a transaction count in said module.

10. The method of claim 9, wherein after step g said method further comprises the steps of:
   h. combining said transaction count, said requested monetary value, and said encrypted first data packet in said module and thereby creating a second data packet;
   i. encrypting said second data packet with a second key in said module thereby creating an encrypted second data packet; and
   j. passing said encrypted second packet to said electronic equipment.

11. The method of claim 10, further comprising the steps of:

k. decrypting said encrypted second data packet with a third key in said electronic equipment thereby creating a decrypted second data packet;

l. determining whether said requested monetary amount sent to said module is the same as in said decrypted second data packet; and m. determining whether said encrypted first data packet sent to said module is the same as in said decrypted second data packet.

12. The method of claim 10, further comprising the steps of:

o. sending said encrypted second data packet from said electronic device to a provider;

p. decrypting said encrypted second data packet with a fourth key by said provider; and q. decrypting said encrypted first data packet with a fifth key by said provider.

13. The method of claim 9, wherein said encryption step utilizes a predetermined encryption technique.

14. The method of claim 13, wherein said predetermined encryption technique is an RSA technique.

15. The method of claim 9, wherein said module is programmable.

* * * * *

UNITED STATES PATENT AND TRADEMARK OFFICE
CERTIFICATE OF CORRECTION

PATENT NO.   : 5,805,702
DATED        : Sep. 8, 1998
INVENTOR(S)  : Curry et al.

It is certified that error appears in the above-identified patent and that said Letters Patent is hereby corrected as shown below:

Column 25, line 20    Replace "(S)"
                      With --(5)--

Signed and Sealed this

Sixth Day of April, 1999

Attest:

Q. TODD DICKINSON

*Attesting Officer*      *Acting Commissioner of Patents and Trademarks*